United States Patent [19]

Bhatti et al.

[11] 4,428,524
[45] * Jan. 31, 1984

[54] METHOD OF FORMING APPARATUS FOR FORMING GLASS FIBERS

[75] Inventors: Mohinder S. Bhatti, Newark; James M. Higginbotham, Sr., Reynoldsburg, both of Ohio

[73] Assignee: Owens-Corning Fiberglas Corporation, Toledo, Ohio

[*] Notice: The portion of the term of this patent subsequent to Aug. 3, 1999 has been disclaimed.

[21] Appl. No.: 378,150

[22] Filed: May 14, 1982

Related U.S. Application Data

[63] Continuation of Ser. No. 255,984, Apr. 20, 1981, Pat. No. 4,342,578.

[51] Int. Cl.³ .................. C03B 37/025; B23K 1/00
[52] U.S. Cl. .................. 228/170; 29/445;
65/1; 65/374.12; 156/272.2; 428/670; 428/940;
228/243; 228/263.19; 228/174
[58] Field of Search ............ 65/1, 374.12, 2;
29/163.5 R, 445; 156/272; 428/940, 670;
228/170, 263.19, 242, 243, 174

[56] References Cited

U.S. PATENT DOCUMENTS

| | | | |
|---|---|---|---|
| 3,065,613 | 11/1962 | Von Wranau | 65/1 |
| 3,157,482 | 11/1965 | Nero et al. | 65/17 |
| 3,248,190 | 4/1966 | Woodward et al. | 65/1 |
| 3,278,282 | 10/1966 | Juray | 65/1 |
| 4,036,601 | 7/1977 | Weiman et al. | 428/663 |
| 4,140,507 | 2/1979 | Costin | 65/374.12 X |
| 4,326,871 | 4/1982 | Harris | 65/12 |

FOREIGN PATENT DOCUMENTS 1242921 8/1971 United Kingdom .

OTHER PUBLICATIONS

Hot Isotatic Procesing MCIC-77-34 Battele Labs. Columbus, Ohio 11/77, pp. 1-99.

Primary Examiner—Robert L. Lindsay, Jr.
Attorney, Agent, or Firm—Ronald C. Hudgens; Robert F. Rywalski; Greg Dziegielewski

[57] ABSTRACT

A method of forming a laminated wall for a feeder for supplying molten streams of glass to be attenuated into filaments comprising: providing a refractory metal core; providing oxygen impervious, precious metal sheathing material around said core, said sheathing material and said core having a plurality of apertures extending therethrough; inserting oxygen impervious, precious metal elements into said apertures to form a loose assembly; and hot isostatically pressing said assembly to form said laminated wall having an oxygen impervious, precious metal sheath and inserts intimately bonded thereto.

5 Claims, 1 Drawing Figure

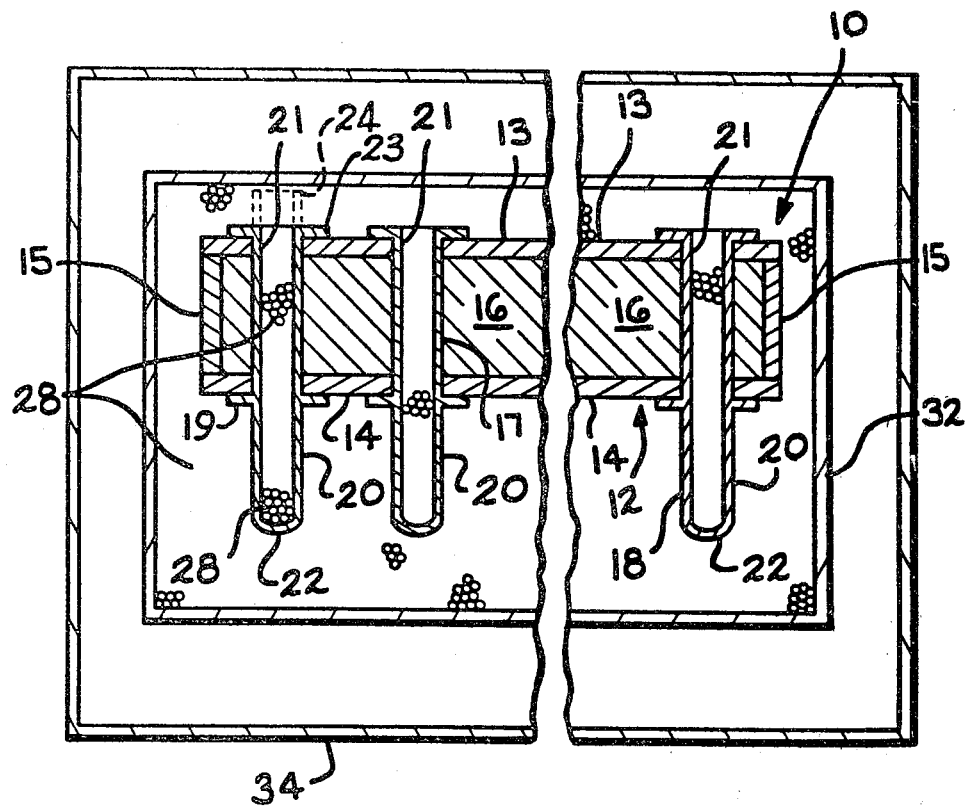

METHOD OF FORMING APPARATUS FOR FORMING GLASS FIBERS

This is a continuation, of application Ser. No. 255,984, filed Apr. 20, 1981 now U.S. Pat. No. 4,342,578 granted Aug. 3, 1982.

TECHNICAL FIELD

The invention disclosed herein relates to a glass fiber forming feeder having at least one laminated wall comprised of a refractory metal substrate having an oxygen impervious, precious metal sheath intimately bonded thereto in combination with precious metal inserts located in the aperture in the laminated wall wherein the substrate, sheath and inserts are simultaneously bonded together by means of hot isostatically pressing the precious metal sheath to the refractory metal substrate.

BACKGROUND ART

There has been a long-felt need to produce a long lasting feeder for flowing streams of molten inorganic material, such as glass, at operating temperatures as high as currently practiced or even higher than currently practiced.

Much of the previous work was directed to forming alloys having superior properties over the unalloyed metals. Feeders in the textile art, or fixed busing art, have historically been made from alloys of platinum and rhodium. Feeders in the wool art, or rotatable feeders, have been produced employing Cobalt based alloys.

The present invention provides inorganic fiber forming feeders wherein the high temperature strength characteristics of refractory metals are combined with the oxidation resistance of precious metals to produce feeders capable of operating at temperatures higher and/or longer periods of time than heretofore commercially practicable.

DISCLOSURE OF THE INVENTION

This invention pertains to a laminated wall for a feeder for supplying molten streams of inorganic material to be attenuated into filaments comprising; a refractory metal core having an oxygen impervious precious metal sheath intimately bonded thereto by hot isostatic pressing, said wall having at least one precious metal lined orifice extending therethrough adapted to pass said molten material therethrough, wherein the core, sheath and hollow inserts lining the apertures in the core and sheath are simultaneously, metallurgically bonded together.

BRIEF DESCRIPTION OF THE DRAWING

The Drawing is an expanded cross-sectional view of the orificed wall positioned in a container for hot isostatic pressing.

BEST MODE OF CARRYING OUT THE INVENTION

According to the principles of this invention, a laminated feeder wall 12, having a plurality of hollow tubular members 18 adapted to flow molten glass therethrough, is produced in a single bonding or welding step from a "loose" assembly of the core or substrates 16, sheathing materials 13, 14, and 15 and elements 18.

There are a number of methods by which to produce a laminated fiber forming feeder wall for textile or rotary wool type operations. For example, see pending applications: Ser. No. 200,677 filed on Oct. 27, 1980 in the name of Mohinder S. Bhatti; Ser. No. 200,676 filed on Oct. 27, 1980 in the names of Mohinder S. Bhatti and Alfred Marzocchi; Ser. No. 200,647 filed on Oct. 27, 1980 in the name of Mohinder S. Bhatti; Ser. No. 200,651 filed on Oct. 27, 1980 in the name of Mohinder S. Bhatti and Ser. No. 200,650 filed on Oct. 27, 1980 in the names of Mohinder S. Bhatti and Alfred Marzocchi, all of which are hereby incorporated by reference.

As shown in the drawing, the fiberization or working walls 12 should be based upon a laminate comprised of a refractory metal core having an oxygen impervious, precious metal sheath intimately bonded thereto by hot isostatic pressing (i.e., HIP).

Particularly, such refractory metals are selected from the group of materials consisting of molybdenum (Mo), columbium (Cb), tungsten (W), rhenium (Re), tantalum (Ta), hafnium (Hf), titanium (Ti), chromium (Cr), zirconium (Zr), vanadium (V) and base alloys of such refractory metals. For example, an alloy of molybdenum, titanium and zirconium, known as TZM, has been shown to provide a superior laminated wall for a fiber forming feeder when clad with a precious metal alloy of platinum and rhodium.

Particularly, the precious metals are selected from a group consisting of platinum (Pt), palladium (Pd), iridium (Ir), osmium (Os), rhodium (Rh), ruthenium (Ru), and alloys based on such metals. Included in the platinum alloys are H alloy and J alloy which are alloys of platinum and rhodium of 90%/10% and 75%/25% composition, respectively.

As disclosed in the aforementioned patent applications, care should be taken in the preparation of the surfaces of the substrate and precious metal layers to insure a good bond between the core and sheath.

Also, element 18 is preferably a hollow tubular member of a precious metal substantially identical with the precious metal sheath material, although different but compatible materials may be employed.

In fabricating a laminated feeder wall 12 according to the principles of this invention, core or substrate 16 is positioned or framed within edge members 15. Core 16 surrounded with edge members 15 is then sandwiched between first and second sheaths 13 and 14; sheaths 13 and 14 also overlap edge members 15. That is, the sheathing materials are comprised of a precious metal first sheath 13, second sheath 14 and edge members 15. However, it is to be understood that the sheathing parts may be fabricated in any suitable shape to closely conform to the exterior surface of core 16.

Apertures 17 may be formed in core 16 and sheaths 13 and 14 either prior to assembling such sections together or subsequent to locating core 16 between first and second sheaths 13 and 14.

If aperture 17 is to be simultaneously formed in core 16 and sheaths 13 and 14, a temporary clamping means or the like can be employed to maintain proper registration between core 16 and sheaths 13 and 14.

Once the core 16 is sandwiched between first sheath 13 and second sheath 14 with plurality of apertures 17 established therethrough, elements 18 are inserted into apertures 17 such that when the assembly 10 is HIP bonded the core of refractory metal is essentially sealed within an oxygen impervious, precious metal layer to prevent the oxidization of the refractory metal core at elevated temperatures.

Each element 18 can consist of a substantially straight, hollow tubular section 20 extending from first sheath 13 to second sheath 14, such that the ends of tube 20 are bonded to first and second sheaths 13 and 14 respectively during the HIP'ing process.

Preferably, elements 18 fit snugly within aperture 17 such that core 16, first and second sheaths 13 and 14 and edge members 15 form a "loose" (i.e., substantially unsealed) but integrated assembly 10.

To produce a "tip type" feeder wall a hollow tubular member, such as disclosed in the aforementioned copending application Ser. No. 200,647, filed on Oct. 27, 1980 in the name of Mohinder S. Bhatti, can be employed. As such hollow tubular member element 18 is comprised of a tubular section 20 having a first or mid flange 19 located along tubular section 20 intermediate first or open end 24 and second end 22 which can be closed or open.

In practice, a tubular element 18 is inserted in each aperture 17 such that first flange 19 is brought into contact or abutting engagement with second sheath or plate 14. A portion of tubular section 20, that is first end 24, projects beyond the exterior surface of first plate 13 a distance sufficient to permit second flange 23 to be formed therefrom. Second flange 23 is formed so as to firmly contact the exterior surface of first plate 13 to form loose assembly 10.

After a number of such elements 18 are provided with flanges 19 and 23 the assembly should have a great deal of integrity and not be "loose" in the traditional sense of the term. In this context, however, "loose" encompasses an assembly of such parts wherein the core 16 is not substantially sealed within a protective precious metal layer. That is, the parts, such as edge members 15, first and second sheaths 13 and 14 and elements 18, may even be tack welded together to form a substantially rigid assembly 10 but, at such point, the refractory metal core would, in essence, not be protected against oxidization at elevated temperatures due to a number of available paths for oxygen containing atmosphere to come in contact with the refractory metal core.

As shown in the drawing, orifice 21 extends substantially the full length of tubular section 20 and terminates at closed end 22. However, it is to be understood that orifice 21 could extend completely through the length of tubular section 22 such that second end 22 is also open. Ultimately, orifice 21 is sized to permit molten inorganic material, such as glass, to flow therethrough as streams that can be attenuated into filaments or fibers.

Once assembly 10 is formed it is ready to be hot isostatically pressed to bond all the parts together to form the laminated feeder wall 12 according to the principles of this invention. To do so, assembly 10 is placed inside a sheet metal container or housing 32 having a pressure transmitting media tightly packed between the container 32 and the assembly 10 and in the orifices 21 of elements 18. That is, the pressure transmitting media is tightly packed in all the space within container 32 not occupied by assembly 10 including orifices 21.

The pressure transmitting media 28 can be of the type in the art known such as powdered metal, beaded glass, such as "Vycor" or amorphous silica. Preferably, orifices 21 are snugly fitted with a solid or fully densified rod of the pressure transducing media 28, which can even be a solid rod of a metal such as molybdenum, or silica, which fluidizes or softens upon application of heat and pressure during the HIP'ing process, as should the rest of the transmitting media to insure a full application of pressure to members 15, plates 13 and 14 and elements 18 to intimately, metallurgically bond them together to seal the refractory metal core 16 within precious metal sheaths 13 and 14, edge members 15 and elements 18.

Preferably the pressure transmitting media 28 should not become so fluid as to "wick" or flow between the surfaces to be bonded together.

Once packed with the pressure transducing media 28, container 32 is evacuated, that is placed in a heated vacuum chamber, and the gas between the transmitting media molecules and parts of the assembly 10 is removed. Then container 32 is sealed and placed within HIP'ing chamber 34. The container 32 containing assembly 10 is subsequently hot isostatically pressed to bond assembly 10 together to form laminated feeder wall 12. The temperatures, pressures and times set forth in the aforementioned patent applications can be employed to form a suitable laminated feeder wall 12. Assembly 10 can be gas pressure or HIP welded to form laminated feeder wall 12 in conformance with the parameters set forth in the "Metals and Ceramics Information Center Report MCIC 77-34" published by the Battelle Columbus Laboratory in 1977.

After HIP'ing container 32 is stripped from around feeder wall 12 and the pressure transmitting media 28 is removed by any suitable means, such as leaching or oxidation. Laminated feeder wall 12 is then ready for subsequent fabrication to form an orificed feeder wall for textile or wool type operations.

It is apparent that within the scope of the invention modifications and different arrangements can be made other than as herein disclosed. The present disclosure is merely illustrative with the invention comprehending all variations thereof.

INDUSTRIAL APPLICABILITY

The invention disclosed herein is readily applicable to the glass fiber industry.

We claim:

1. A method of making a feeder for supplying streams of molten glass to be attenuated into filaments comprising:
   assembling a plurality of layers of material wherein one of said layers is a refractory metal and another of said layers is a precious metal, said plurality of layers having a plurality of apertures extending therethrough;
   inserting elements in said apertures to form a loose assembly;
   isostatically pressing said loose assembly;
   heating the isostatically pressed assembly to intimately bond the plurality of layers and the elements to form a unitary laminate; and
   forming an orifice in said elements to permit the molten glass to issue therefrom as said streams, said precious metal layer and said elements preventing the oxidation of said refractory metal layer at elevated temperatures.

2. A method of making a feeder for flowing a stream of molten inorganic material therethrough comprising:
   assembling a plurality of layers of material wherein one of said layers is a refractory metal and another of said layers is a precious metal, said plurality of layers having an aperture therein;
   inserting an element in said aperture to form a loose assembly;
   isostatically pressing said loose assembly;

heating the isostatically pressed assembly to intimately bond the plurality of layers and element to form a unitary laminate; and forming an orifice in said element to permit the molten material to flow therethrough, said precious metal layer and said element preventing the oxidation of said refractory metal layer at elevated temperatures.

3. The method of claim 2 wherein the refractory metal layer is a material selected from the group consisting of Ti, V, Cb, Ta, Cr, Mo, W, Re and base alloys thereof and wherein said precious metal layer and said element are a material of the group consisting of Pt, Pd, Ir, Os, Rh, Ru and base alloys thereof.

4. The method of claim 3 wherein the refractory metal is intimately bonded to said precious metal.

5. The method of claim 4 wherein the refractory metal is diffusion bonded to said precious metal.

* * * * *